June 6, 1950  M. BLAU ET AL  2,510,795
ALPHA RAY SOURCE AND METHOD OF PRODUCING SAME
Filed Dec. 29, 1945
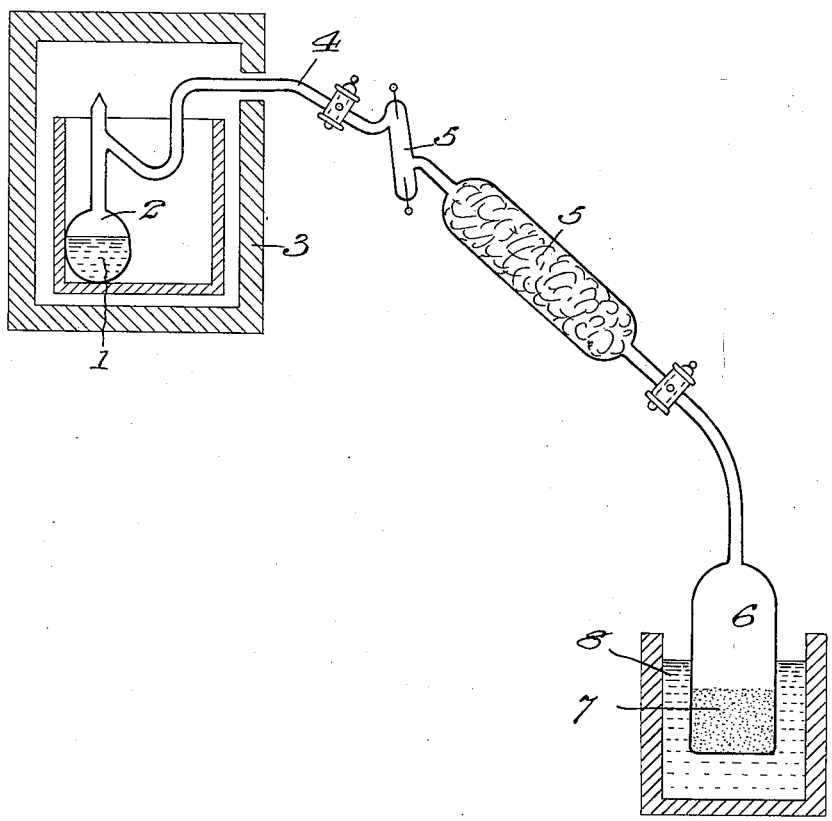
INVENTORS:-
Marietta Blau and
BY Boris Pregel
Brown & Seward
ATTORNEYS Patented June 6, 1950

2,510,795

UNITED STATES PATENT OFFICE 2,510,795

ALPHA RAY SOURCE AND METHOD OF PRODUCING SAME

Marietta Blau and Boris Pregel, New York, N. Y., assignors to Canadian Radium & Uranium Corporation, New York, N. Y., a corporation of New York Application December 29, 1945, Serial No. 638,052

9 Claims. (Cl. 204—154)

This invention relates to an alpha ray source and method of producing same.

An object of the invention is to provide a homogeneous constant source of alpha rays which will be free from emanation.

A further object is to provide such a source by a method which is simple and commercially practical.

There is an increasing demand for radio-active preparations emitting alpha rays. Such preparations are used for neutralizing the electric charge caused by friction phenomena, for lowering the spark potential, and as a source for ionization. These preparations are also built into vacuum tubes for electronic and photo-electric devices, and for other purposes.

Radium or polonium preparations are normally used as alpha ray sources. However, with the use of radium there is always the possibility of emanation which is very difficult to do away with. And when using polonium there is the disturbing factor that such preparations have a very short life of no more than 140 days; for that reason the use of the polonium preparation is limited to cases where renewal and replacement can readily be effected. It is impractical, therefore, to use polonium in vacuum tubes, although polonium is the ideal alpha source because there is no emanation, and because preparations can be made as strong as desired and homogeneous.

These objections are overcome in the present method which results in the provision of a radium D-polonium preparation as the source of alpha radiation.

The single figure of the drawing represents diagrammatically a simple arrangement of apparatus suitable for carrying out the method, as follows.

A strong radium solution 1, such as $RaBr_2$ or $RaCl_2$ in water, or Hahn's preparation, having good emanating properties, is placed in a closed vessel 2 and subjected to heat in a suitable manner (as in the oven 3) to promote the formation of radium emanation (radon). The emanation is conducted through a tube 4 and suitable purifying apparatus 5, 5 to a freezing chamber 6 containing a very fine metallic powder 7. The chamber 6 and powder 7 are maintained at a low temperature, for instance by immersion in liquid air 8, and the emanation is thereby deposited and stored in solidified form in the powder.

When it is determined that the desired concentration of emanation has been attained, the supply is cut off and the metallic powder with emanation frozen therein is allowed to stand long enough to permit decay of the emanation, through the active deposits radium A, B, and C' or C'', to radium D; i. e., about three days. Radium D (half-life 22 years) is the mother substance of radium E (half-life 5 days) which disintegrates to polonium; the polonium thus produced will remain in equilibrium with the RaD and will decrease with the period of the latter so that a constant stable source of polonium results.

Since RaD, RaE and polonium are free from gamma radiations (for practical purposes) it will be seen that this method results in the formation of an alpha ray source having the characteristics desired. The beta radiations of RaD and RaE have a relatively high absorption coefficient (as compared to gamma radiation) and will not be objectionable.

The RaD-RaE-Po-metal powder may be pressed or rolled into a thin layer on a metal backing or may be used in any form desired, as a highly effective long-lived source of alpha rays without emanation.

Various metals can be used to form the metal powder, depending on the ultimate purpose for which the preparation is intended. For example, gold, rhodium, aluminum and silicon are suitable for some purposes, and other metals or alloys may also be used. If desired, the powder may be a non-metallic material such as glass or synthetic plastic, in which case the sheeting or molding into forms convenient for use is facilitated. The solidifying of the emanation makes it possible to obtain concentrations far higher than would result from its use in the gaseous state.

An advantage of the procedure described resides in the fact that radium is readily available in any necessary quantities and in the further fact that no radioactive material is destroyed in carrying out the method.

What we claim is:

1. The method of producing an alpha ray source which includes, depositing radium emanation in a solid state in a finely divided solid supporting material and maintaining said emanation in a solid state until decay thereof to radium D and polonium has taken place for most of the said emanation.

2. The method of producing an alpha ray source which includes, providing an active source of radium emanation, purifying the emanation therefrom, providing a quantity of finely divided solid supporting material, cooling said material to a temperature below the freezing point of the emanation, depositing the emanation in a solid state in said material, and maintaining said emanation in a solid state until decay thereof to radium D and polonium has taken place for most of the said emanation.

3. The method according to claim 1 in which the supporting material is a metallic powder.

4. The method according to claim 2 in which the supporting material is a metallic powder.

5. The method according to claim 1 in which the supporting material is a glass powder.

6. The method according to claim 2 in which the supporting material is a glass powder.

7. The method according to claim 1 in which the supporting material is a plastic powder.

8. The method according to claim 2 in which the supporting material is a plastic powder.

9. The method according to claim 2 which includes, forming the resulting composition into a thin film or sheet.

MARIETTA BLAU.
BORIS PREGEL.

REFERENCES CITED

The following references are of record in the file of this patent:

UNITED STATES PATENTS

| Number | Name | Date |
| --- | --- | --- |
| 787,928 | Lieber | Apr. 25, 1905 |
| 1,570,834 | Hess et al. | Jan. 26, 1926 |
| 2,326,631 | Fischer | Aug. 10, 1943 |

FOREIGN PATENTS

| Number | Country | Date |
| --- | --- | --- |
| 479,224 | Great Britain | Feb. 2, 1938 |
| 602,598 | Germany | Sept. 12, 1934 |
| 650,902 | Germany | Oct. 6, 1937 |

OTHER REFERENCES

Chemical Abstracts 23,5405 (1929), Abstract of Henderson Article, Proc. Cambridge Phil. Soc. 25, 344-6 (1929).

Blackwood et al., Atomic Physics, 2nd edition, page 238, John Wiley (1937).

Mellow, Comprehensive Treatise on Inorganic and Theoretical Chemistry, 1923 edition, volume 4, page 96.